US009927786B2

(12) United States Patent
Dewitte

(10) Patent No.: US 9,927,786 B2
(45) Date of Patent: Mar. 27, 2018

(54) EXPANDABLE AND COLLAPSIBLE SHAPE ELEMENT FOR A PROGRAMMABLE SHAPE SURFACE

(71) Applicant: Anne Dewitte, Fairport, NY (US)

(72) Inventor: Anne Dewitte, Fairport, NY (US)

(*) Notice: Subject to any disclaimer, the term of this patent is extended or adjusted under 35 U.S.C. 154(b) by 437 days.

(21) Appl. No.: 14/874,373

(22) Filed: Oct. 2, 2015

(65) Prior Publication Data

US 2016/0098027 A1 Apr. 7, 2016

Related U.S. Application Data

(60) Provisional application No. 62/059,004, filed on Oct. 2, 2014.

(51) Int. Cl.
| | | |
|---|---|---|
| *H01L 41/09* | (2006.01) | |
| *G05B 19/042* | (2006.01) | |
| *G06F 3/01* | (2006.01) | |
| *G06F 1/16* | (2006.01) | |
| *G06F 3/041* | (2006.01) | |
| *G09B 21/00* | (2006.01) | |

(52) U.S. Cl.
CPC ......... *G05B 19/042* (2013.01); *G06F 1/1601* (2013.01); *G06F 1/1637* (2013.01); *G06F 3/016* (2013.01); *G06F 3/041* (2013.01); *G06F 3/0412* (2013.01); *G06F 3/0416* (2013.01); *G09B 21/003* (2013.01); *G06F 2200/1612* (2013.01); *G06F 2203/04103* (2013.01)

(58) Field of Classification Search
CPC ... G05B 19/042; G06F 1/1601; G06F 1/1637; G06F 3/016; G06F 3/041; G06F 3/0412; G06F 3/0416; G09B 21/003

USPC ...................................... 310/12–14, 311, 328
See application file for complete search history.

(56) References Cited

U.S. PATENT DOCUMENTS

| | | |
|---|---|---|
| 4,138,939 A | 2/1979 | Feld |
| 4,704,696 A | 11/1987 | Reimer et al. |
| 4,806,815 A | 2/1989 | Honma |
| 5,496,174 A | 3/1996 | Garner |
| 5,726,480 A | 3/1998 | Pister |
| 6,184,608 B1 | 2/2001 | Cabuz et al. |
| 6,487,454 B1 | 11/2002 | Tymes |
| 6,636,202 B2 | 10/2003 | Ishmael, Jr. et al. |
| 7,009,595 B2 | 3/2006 | Roberts et al. |
| 7,533,498 B2 | 5/2009 | Zeigler |

(Continued)

FOREIGN PATENT DOCUMENTS

| | | | |
|---|---|---|---|
| CA | 2173637 | 10/1996 | |
| GB | 171865 | * 12/1921 | ............... E06B 1/36 |

(Continued)

*Primary Examiner* — Thomas Dougherty
(74) *Attorney, Agent, or Firm* — Tracy Jong Law Firm; Tracy P. Jong; Cheng Ning Jong

(57) ABSTRACT

An expandable and collapsible structure comprising at least two first members and a second member. Each first member includes two plates rotatably connected at an edge of each of the two plates. One of the two plates of each of the first members is adapted to be slidably coupled with the second member. When the two plates of each of the pair of first members are disposed in a non-parallel configuration, the structure is disposed in an expanded state and when the two plates of each of the first members are disposed in a parallel configuration, the structure is disposed in a collapsed state.

20 Claims, 10 Drawing Sheets

(56) References Cited

U.S. PATENT DOCUMENTS

| | | |
|---|---|---|
| 7,589,714 B2 | 9/2009 | Funaki |
| 8,047,849 B2 | 11/2011 | Ahn et al. |
| 8,402,711 B2 | 3/2013 | Lusk et al. |
| 8,424,265 B2 | 4/2013 | Lusk |
| 8,473,123 B2 | 6/2013 | Sun et al. |
| 8,717,326 B2 | 5/2014 | Ciesla |
| 2003/0117371 A1 | 6/2003 | Roberts et al. |
| 2012/0268412 A1 | 10/2012 | Cruz-Hernandez et al. |

FOREIGN PATENT DOCUMENTS

| | | | | | |
|---|---|---|---|---|---|
| GB | 268444 | * | 5/1927 | ............... | E06B 3/90 |
| GB | 541109 | * | 5/1941 | ............... | E06B 3/48 |
| GB | 744580 | * | 2/1956 | ................ | B60P 3/34 |

* cited by examiner

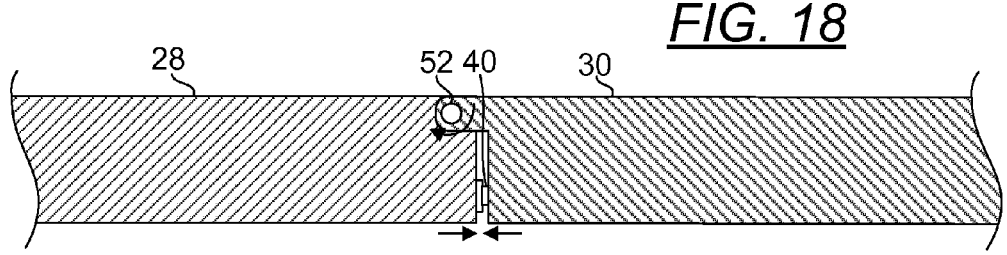
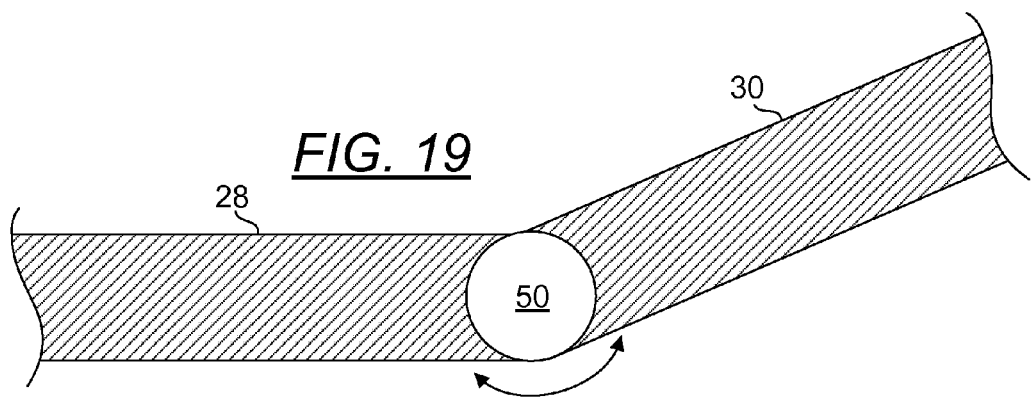
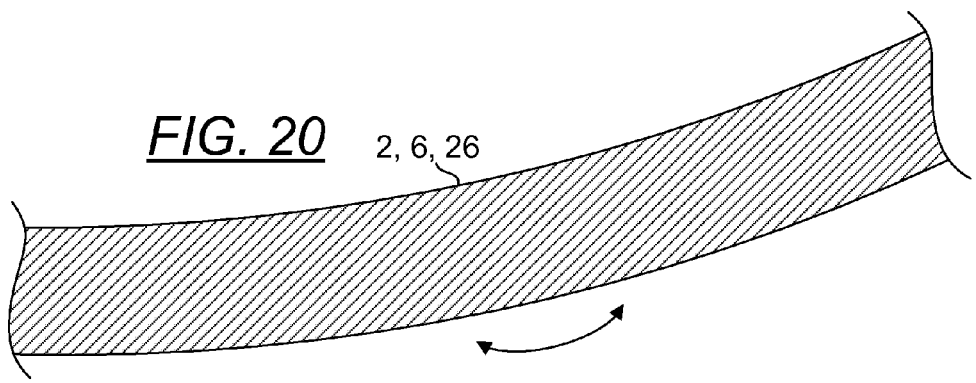

EXPANDABLE AND COLLAPSIBLE SHAPE ELEMENT FOR A PROGRAMMABLE SHAPE SURFACE

PRIORITY CLAIM AND RELATED APPLICATIONS

This non-provisional application claims the benefit of priority from provisional application U.S. Ser. No. 62/059,004 filed on Oct. 2, 2014. Said application is incorporated by reference in its entirety.

BACKGROUND OF THE INVENTION

1. The Field of the Invention

The present invention is directed generally to expandable and collapsible shape elements for a programmable shape surface. More specifically, the present invention is directed to expandable and collapsible shape elements capable of being programmed to form surface features of various three dimensional shapes and sizes.

2. Background Art

The visually impaired are at a disadvantage when information and control systems overwhelmingly rely on visual attention. Such is the current situation where touchscreens, which rely primarily on visual attention, are used for personal computers, smart phones, vehicular interfaces and home appliances.

Visual impairment often describes people with physical ailments but it also describes anyone in a situation where visual ability is degraded. Environmental conditions such as night time, underwater, high particulate atmospheres, and dark rooms degrade visual ability. Also multitasking, such as driving a vehicle and controlling an audio system, decreases visual attention on the primary task. Based on this broad interpretation of visual impairment, most people experience situations where visual ability is compromised. This creates a need for interfaces that interact with senses other than vision.

Auditory systems such as text to speech and voice control are well represented in industry and currently serve as an established enhancement to visual interfaces. U.S. Pat. No. 4,704,696 to Reimer et al. discloses a method and apparatus for voice control of a computer. As another example, major computer operating systems such as Apple's OSX of Apple, Inc. and Microsoft's Windows of Microsoft Corporation include auditory assistive technology. Though auditory systems increase accessibility to information, they do not fit all environments, such as noisy conditions, nor do they fit all content, such as mathematical notation.

Assistive technologies that use the sense of touch are typically called tactile displays. These displays communicate information either in graphical form or with a structured language such as Braille. Tactile displays have progressed from stiff, static pages to refreshable displays that are able to translate visual information from a computer to a tactile representation.

As with auditory systems, tactile displays currently do not fit all environments and content. However auditory systems are established and integrated in currently available devices, whereas dynamic tactile displays are still a developing technology.

Tactile displays have various underlying technologies and physical outputs. The most common commercial products are Braille pin arrays such as Braille Wave by Handy Tech Elektronik GmbH or Braille Connect by HumanWare. Pin arrays typically use mechanical methods to control vertical displacement of fixed height pins, e.g., those disclosed in U.S. Pat. No. 7,009,595, to Roberts et al. Other systems use fluid chambers to create pin-like structures, e.g., those disclosed in U.S. Pat. No. 8,047,849 to Ahn et al.

U.S. Pat. No. 8,717,326 to Ciesla discloses an alternative tactile display that uses microfluidics to inflate and deflate areas on top of a touchscreen display. Other more recent tactile displays use vibrotactile technology which provides touch feedback with the use of vibrating actuators or motors. U.S. Pat. Pub. No. 2012/0268412 of Cruz-Hernandez et al. discloses a vibrotactile technology that integrates well with display and touch components and is currently available in the consumer marketplace. Currently, there lacks a surface that is capable of being transformed at will into one or more desired physical shape or button such that a user, regardless of whether he is visually impaired, may distinguish the one or more physical shape or button visually or tactilely or both from their surroundings. Thus, there is a need for a structure or shape element capable of being transformed from a relatively flat collapsed state to a shape that is distinguishable from a flat shape in its expanded state and doing so with a relatively flat and thin underlying support structure.

SUMMARY OF THE INVENTION

In accordance with the present invention, there is provided an expandable and collapsible structure comprising at least two first members and a second member. Each first member includes two plates rotatably connected at an edge of each of the two plates. One of the two plates of each of the first members is adapted to be slidably coupled with the second member. When the two plates of each of the pair of first members are disposed in a non-parallel configuration, the shape element is disposed in an expanded state and when the two plates of each of the first members are disposed in a parallel configuration, the shape element is disposed in a collapsed state.

In one embodiment, the present shape element includes a linear actuator adapted to cause a plate of a member to slide with respect to a plate of another member.

In one embodiment, the linear actuator is an inchworm motor.

In one embodiment, at least one of the plates of the at least two first members and the second member further includes a top surface having an area of less than about 1 $cm^2$.

In one embodiment, the present shape element further includes a display element disposed on any one of the at least two first members and the second member.

In one embodiment, the present shape element further includes a force sensing element disposed on any one of the at least two first members and the second member.

In one embodiment, the present shape element further includes at least one fourth member having two plates rotatably connected at an edge of each of the two plates, one of the two plates of the fourth member is adapted to be slidably coupled with the second member.

In one embodiment, the present shape element further includes an actuator adapted to cause two plates of a member to rotate about one another.

It is the primary object of the present invention to provide a shape element capable of a tangible disruption on the surface one which it is disposed, when the shape element is expanded and flat when collapsed.

Another object of the present invention is to provide a shape element capable of maintaining a footprint it occupies in the collapsed and expanded states. In other words, on a three dimensional grid with a surface plane defined by X-Y axes and a Z-axis being an axis normal to the X-Y plane, the shape element is maintained within the same area of the X-Y plane although in its expanded state, the shape element is capable of expanding in a direction along the Z-axis.

Another object of the present invention is to create a shape element that is structurally sound to withstand force applied from the top and laterally.

Another object of the present invention is to provide surfaces that may be used as tactile display devices.

Another object of the present invention is to provide surfaces capable of sensing forces applied to them.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 18 is a partial side cross-sectional view of two rotatably coupled plates, depicting the same mechanism as shown in FIG. 17 for causing relative motion between the two plates but in the opposite direction.

FIG. 19 is a partial side cross-sectional view of two rotatably coupled plates, depicting yet another mechanism for causing relative motion between the two plates.

FIG. 20 is a partial side cross-sectional view of another embodiment of a first member, a third member or a fourth member.

PARTS LIST

2—first member
4—second member
6—third member
8—end plate of third member
10—center plate of third member
12—end plate of third member
14—center plate of third member
16—first shape element
18—second shape element
20—third shape element
22—surface plane
24—grid of expandable/collapsible shape element
26—fourth member
28—end plate of fourth member
30—center plate of fourth member
32—force sensing element
34—display element
36—controller
38—inchworm motor
40—solenoid
42—lateral piezo
44—forward piezo
46—aft piezo
48—cavity
50—rotary actuator
52—hinge

PARTICULAR ADVANTAGES OF THE INVENTION

The present shape elements are different from other programmable shape surfaces in that the actuation mechanisms of the shape elements are embedded within the shape elements themselves. This creates a thin structure that does not rely on fixed pin heights as required in a pin array or a fluidic pump infrastructure where leakage is a concern.

In many collapsible structures or shape elements, the occupied surface area in a collapsed state is not equal to the occupied surface area in an expanded state. It is important to maintain the same surface area, as with the present shape elements, regardless of individual shape element states. It is unacceptable to expand one area of the surface at the expense of another area of the surface which is the case for typical expandable/collapsible shape elements.

Scaled skin such as the skin of a snake or a fish overlap in one direction, creating a smooth surface in one direction and rough surface in the opposition direction. The surface of the present shape elements is of similar smoothness from all directions.

It is conceivable that combinations of expanded and collapsed shape elements can be used to create a tangible disruption to the surface. This disruption may be in the form of recognizable shapes, such as points, triangles, rectangles, circles, and lines. Varying individual shape element height can also create gradient surfaces such as rounded caps. In addition, surface motion can be created by oscillating shape elements between collapsed and extended states.

DETAILED DESCRIPTION OF A PREFERRED EMBODIMENT

Figure 1:
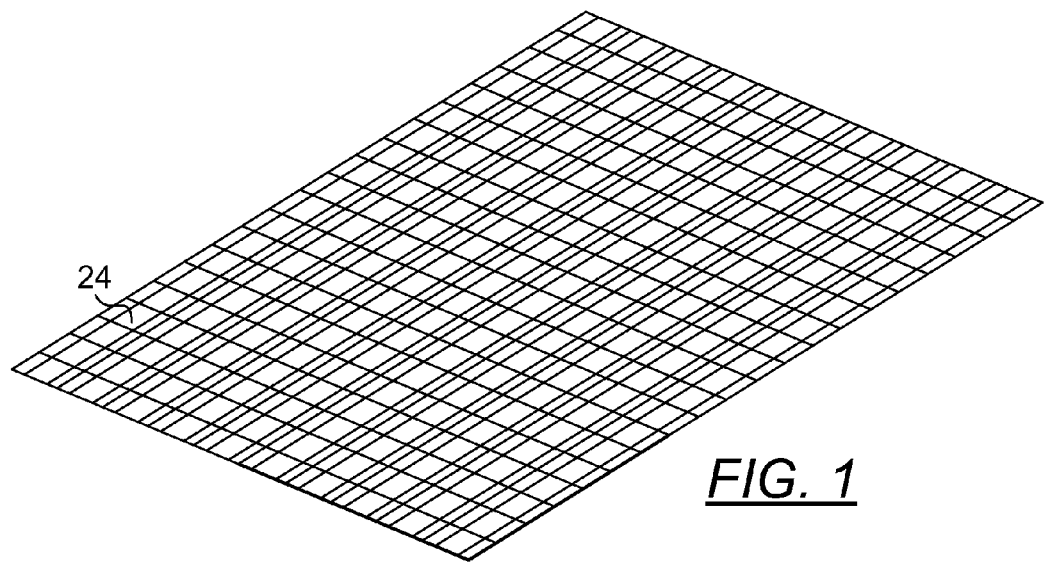
FIG. 1 is a top perspective view of a grid of expandable/collapsible shape elements with all shape elements disposed in their collapsed state.
Figure 2:
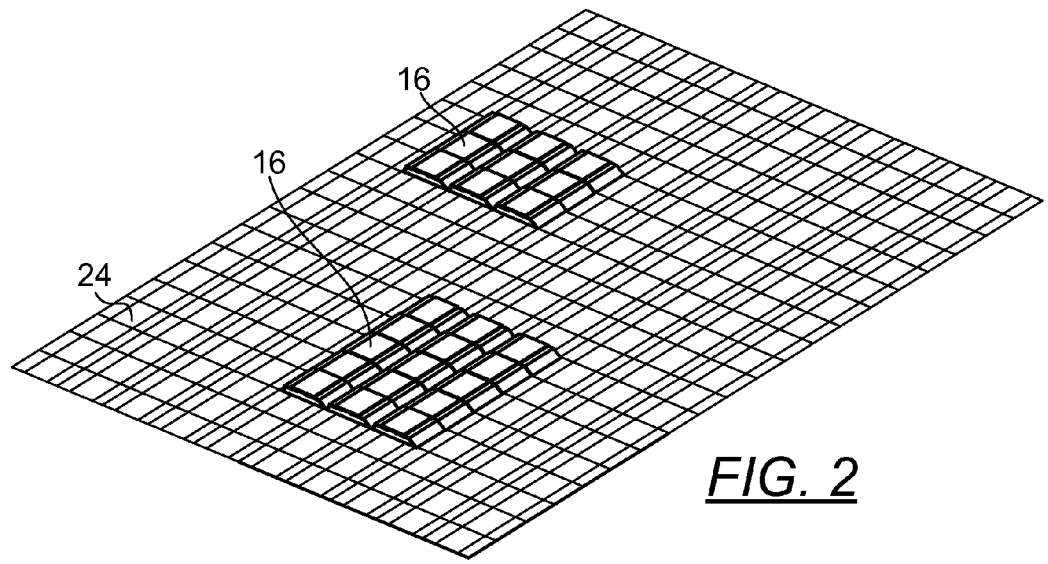
FIG. 2 is a top perspective view of a grid of expandable/collapsible shape elements with some shape elements disposed in their collapsed state and two groups of shape elements disposed in their expanded state.

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower). FIG. 1 is a top perspective view of a grid 24 of expandable/collapsible shape elements with all shape elements disposed in their collapsed state. FIG. 2 is a top perspective view of a grid 24 of expandable/collapsible shape elements with some shape elements disposed in their collapsed state and two groups of shape elements disposed in their expanded state. An aggregate of shape elements as those shown in FIGS. 1 and 2 can be used to create a programmable shape surface or grid 24. Referring to FIG. 1, in its collapsed state, a shape element lays flat with the surface plane which creates a relatively level and even surface. Referring to FIG. 2, in its expanded state, a shape element unfolds to become a cube-like structure that extends vertically from the surface plane which approximates the plane at which the shape elements lay at their collapsed state. As shown in FIG. 2, there are nine expanded shape elements in one group, i.e., three rows of three shape elements and fifteen expanded shape elements in another group, i.e., three rows of five elements. Such shape elements may be used for a tactile display and/or user interface where the cube-like structures may constitute buttons for easy detection of and interaction with such surface features or disruptions.

Figure 3:
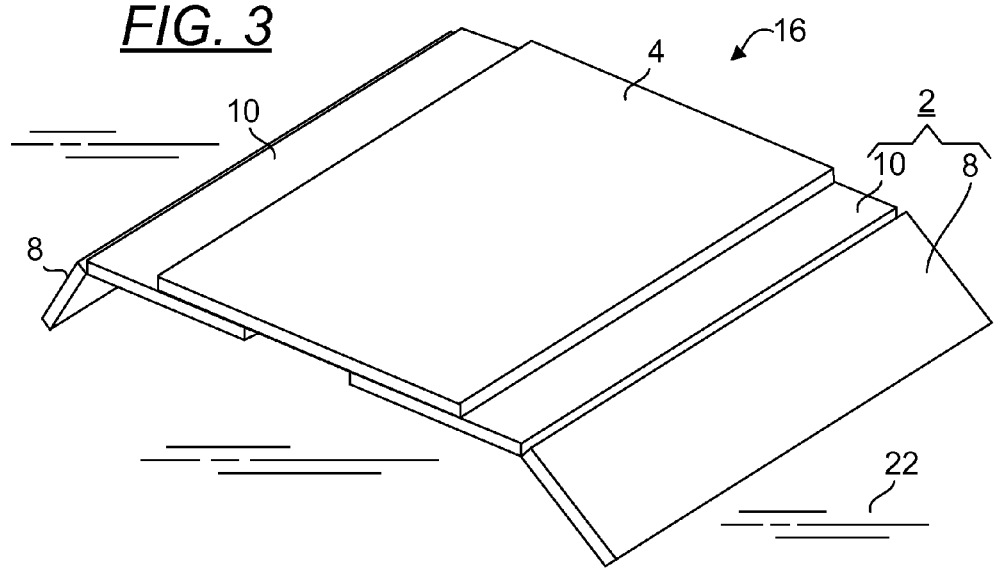
FIG. 3 is a top perspective view of an expandable/collapsible shape element disposed in an expanded state.
Figure 4:
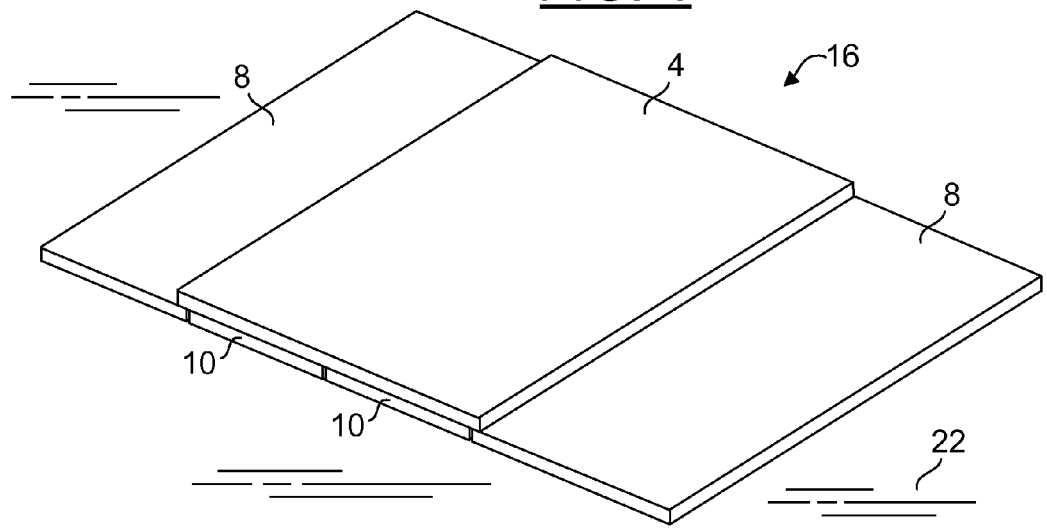
FIG. 4 is a top perspective view of an expandable/collapsible shape element disposed in a collapsed state.

FIG. 3 is a top perspective view of an expandable/collapsible shape element 16 disposed in an expanded state. FIG. 4 is a top perspective view of an expandable/collapsible shape element 16 disposed in a collapsed state. Each shape element 16 includes two first members 2 and a second member 4. Each first member 2 includes two plates 8, 10 rotatably connected at an edge of each of the two plates 8, 10. One of the two plates 8, 10 of each of the first members 2 is adapted to be slidably coupled with the second member 4. When the two plates 8, 10 of each of the pair of first members 2 are disposed in a non-parallel configuration as shown in FIG. 3, the shape element 16 is disposed in an expanded state. When the two plates 8, 10 of each of the first members 2 are disposed in a parallel configuration as shown in FIG. 4, the shape element 16 is disposed in a collapsed state.

Figure 5:
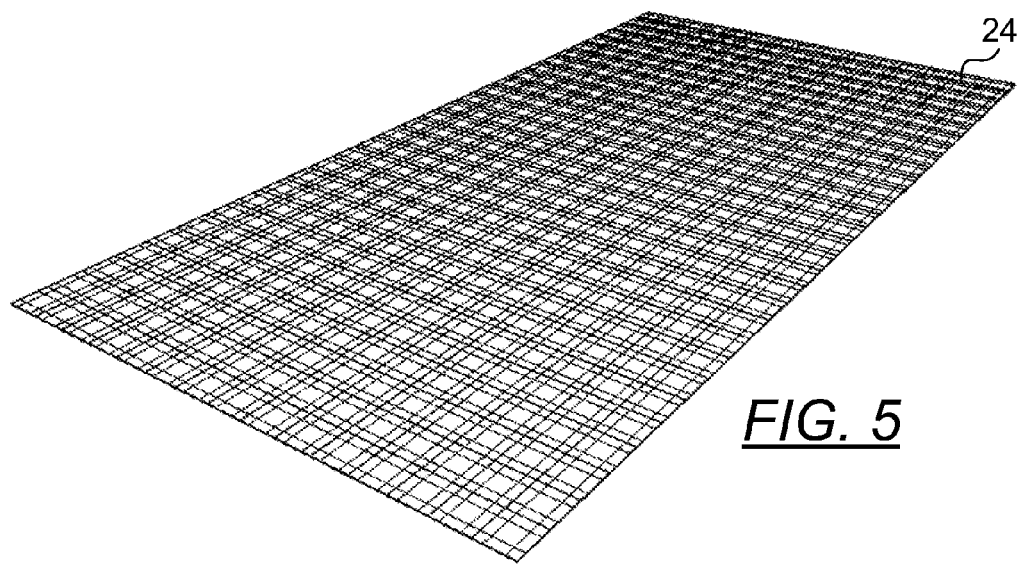
FIG. 5 is a top perspective view of a grid of expandable/collapsible shape elements with all shape elements disposed in their collapsed state.
Figure 6:
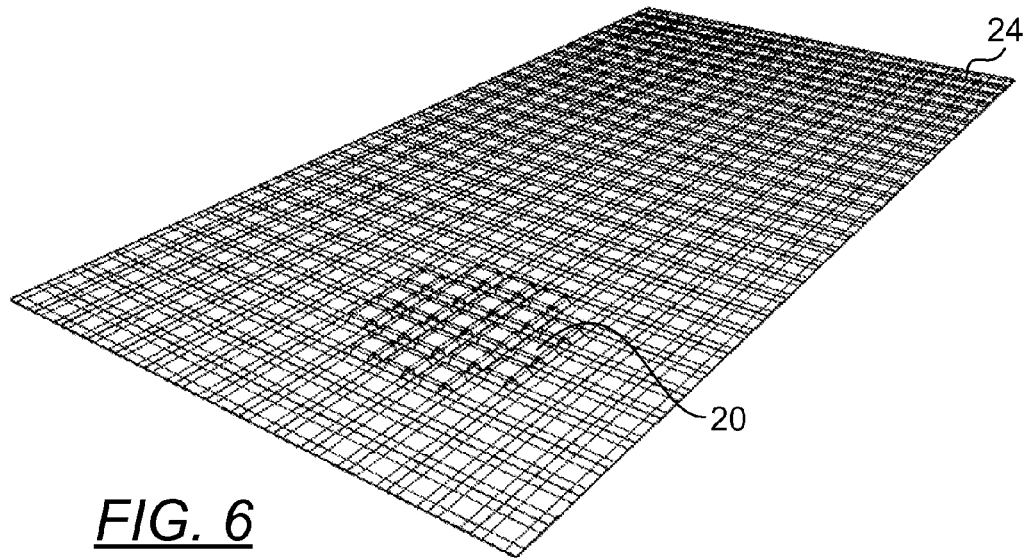
FIG. 6 is a top perspective view of a grid of expandable/collapsible shape elements with some shape elements disposed in their collapsed state and one group of shape elements disposed in their expanded state.

FIG. 5 is a top perspective view of a grid 24 of expandable/collapsible shape elements with all shape elements 20 disposed in their collapsed state. FIG. 6 is a top perspective view of a grid 24 of expandable/collapsible shape elements with some shape elements disposed in their collapsed state and one group of shape elements 20 disposed in their expanded state. It shall be appreciated that the shape elements 20 depicted in FIG. 6 include components or members disposed in a direction transverse to the direction defined by the first members 2 when compared to the first shape elements 16 of FIGS. 2-4, the details of which are disclosed in FIGS. 7-11.

Figure 7:
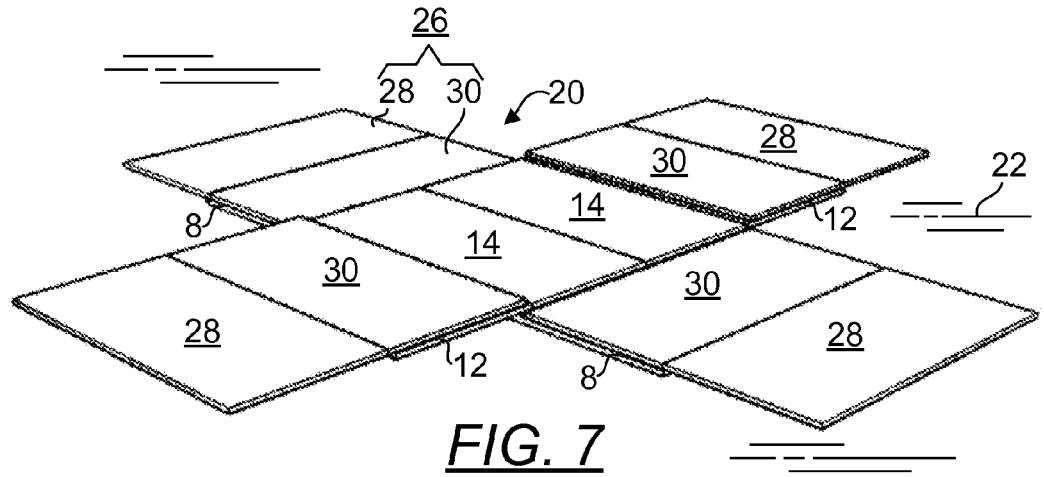
FIG. 7 is a top perspective view of an expandable/collapsible shape element disposed in a collapsed state.
Figure 8:
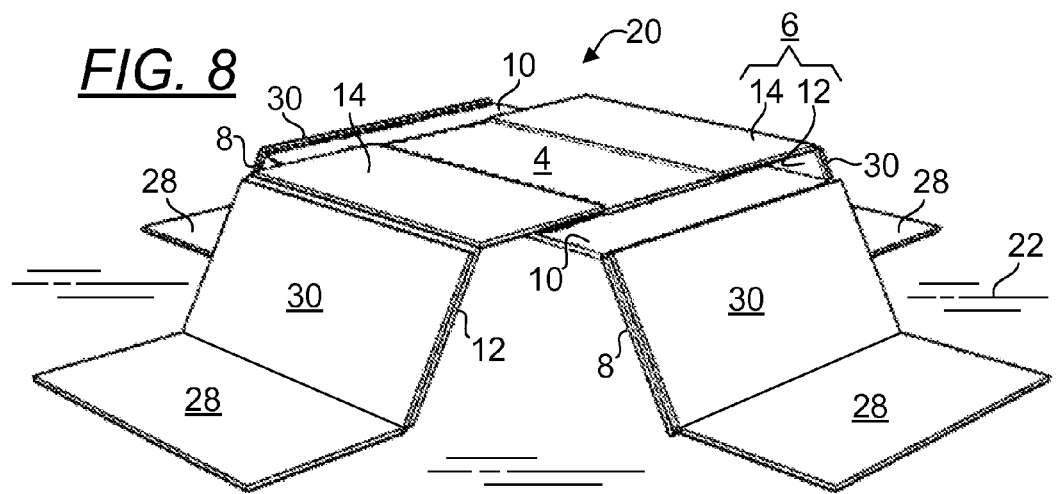
FIG. 8 is a top perspective view of an expandable/collapsible shape element disposed in an expanded state.
Figure 8A:
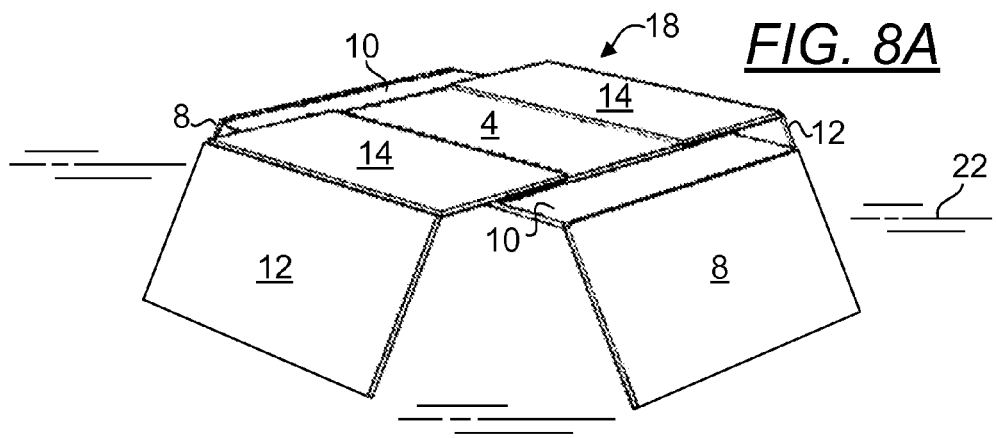
FIG. 8A is top perspective view of an expandable/collapsible shape element disposed in an expanded state.
Figure 9:
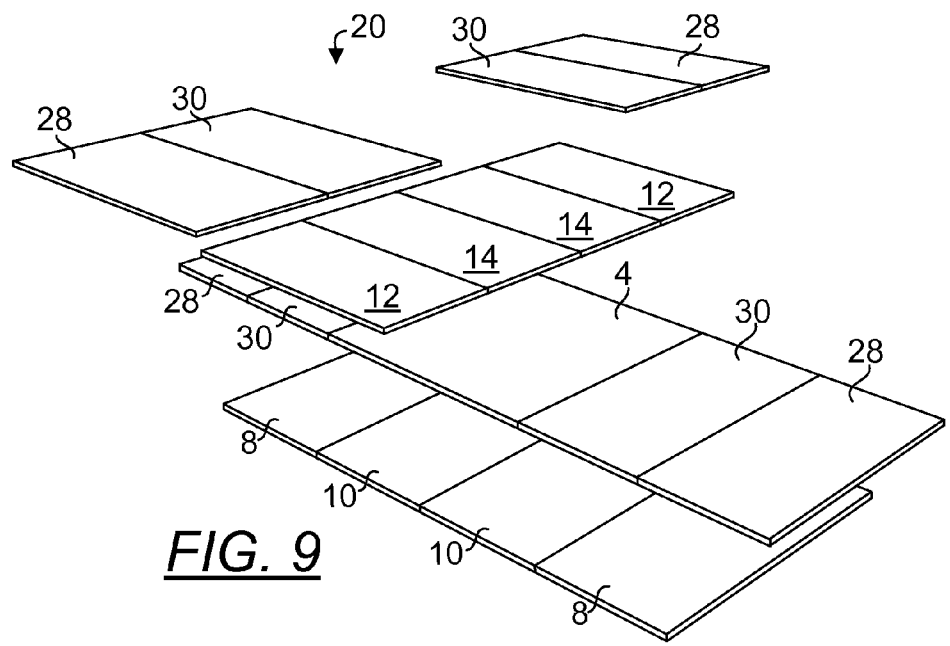
FIG. 9 is a top perspective view of an expandable/collapsible shape element depicted in its basic layers of components from which the shape element is formed.
Figure 10:
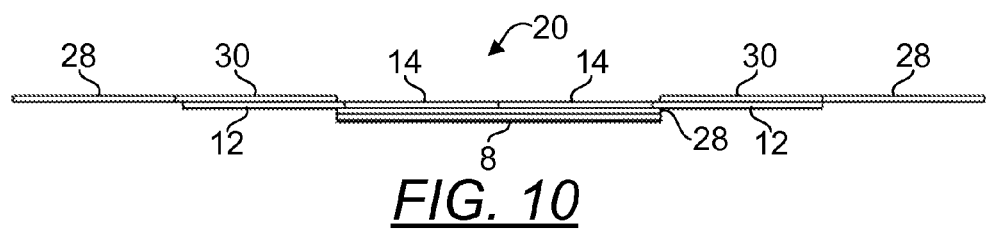
FIG. 10 is an exploded view of an expandable/collapsible shape element depicted in its basic layers of components from which the shape element is formed.
Figure 11:
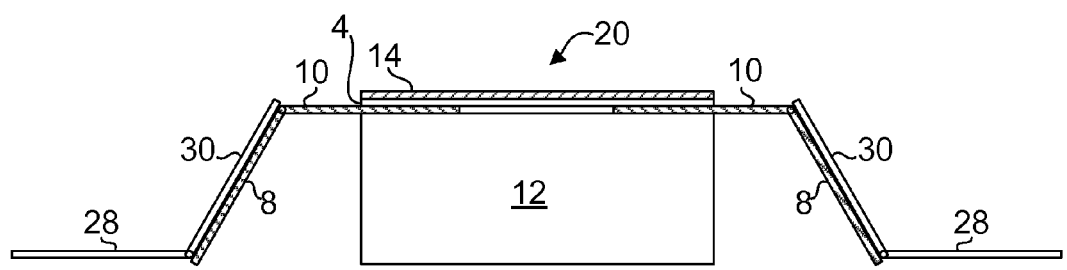
FIG. 11 is a cross-sectional view of an expandable/collapsible shape element depicted in its basic layers of components from which the shape element is formed.

FIG. 7 is a top perspective view of an expandable/collapsible shape element 20 disposed in a collapsed state. FIG. 8 is a top perspective view of an expandable/collapsible shape element 20 disposed in an expanded state. FIG. 8A is top perspective view of an expandable/collapsible shape element 18 disposed in an expanded state. FIG. 9 is an exploded view of an expandable/collapsible shape element 20 depicted in its basic layers of components from which the shape element is formed. FIG. 10 is a side view of an expandable/collapsible shape element 20 depicted in its basic layers of components from which the shape element is formed. FIG. 11 is a cross-sectional view of an expandable/collapsible shape element 20 depicted in its basic layers of components from which the shape element is formed. The shape element 20 shown in FIGS. 7-8 and 9-11 further includes third members 6 having two plates 12, 14. The center plate 14 of a third member 6 is adapted to be slidably coupled with the second member 4. The shape element 20 further includes fourth members 26, each having two plates 28, 30 rotatably connected at an edge of each of the two plates 28, 30. One of the two plates 28, 30 of the fourth member 26 is adapted to be slidably coupled with a plate 8 of the first member 2. Without any fourth members 26, the shape element is termed second shape element 18 as shown in FIG. 8A. By incorporating the fourth member 26, the shape element 20 is constructed with increased structural integrity at the expense of space. However, such increased integrity may be required in applications, e.g., control surfaces in factory or rugged environments. In one embodiment, each shape element is anchored to the surface plane 22 upon which it is disposed. In another embodiment, a shape element is not individually anchored but rather anchored by a fixed edge or to another shape element.

Figure 12:
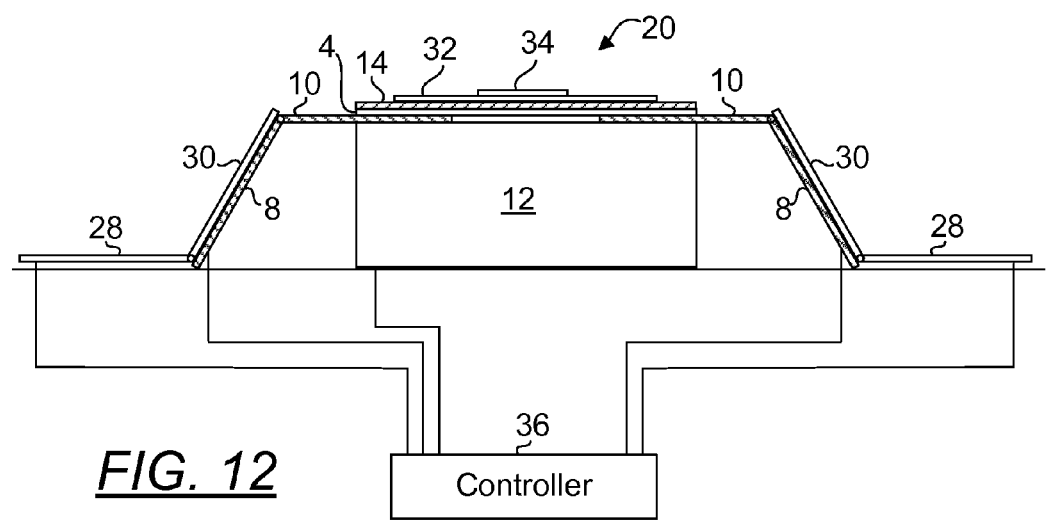
FIG. 12 is a diagram of an expandable/collapsible shape element depicting a controller configured to control various actuators and sensors of the shape element.

FIG. 12 is a diagram of an expandable/collapsible shape element 20 depicting a controller 36 configured to control various actuators and sensors of the shape element. In one embodiment, a present shape element further includes a display element 34 disposed on any members 2, 4, 6, 26, preferably those that are visible to users. Display elements include, but not limited to, Liquid Crystal Display (LCD) and Light-Emitting Diode (LED) elements. In one embodiment, a present shape element further includes a force sensing element 32 disposed on any members 2, 4, 6, 26 accessible to receive user selections via the user's input, e.g., finger swipe, button push etc. In one embodiment, any one of the members 2, 4, 6, 26 includes a top or broad surface area of less than about 1 $cm^2$ and therefore capable of miniaturization when used in a grid format. Wherever appropriate, input connections from sensors to the controller 36 and output connections from the controller 36 to actuators, motors or other output devices are made through the members 2, 4, 6, 26 to reduce the amount of conventional wiring. Only one set of connections is shown in FIG. 12. In practice, one set of connections is required for each shape element if each shape element on a grid is to be individually controllable. A computer program may specify the pattern that is required to be displayed on the grid. For instance, if a relatively large green-colored button is to be displayed on the grid, ten rows of ten shape elements may be expanded and their display elements lit with green color until the "button" that is made up of the expanded shape elements is pushed and sensed by one or more force sensing elements disposed on one or more shape elements which make up the button.

Expansion or collapse of a shape element can be achieved by causing relative sliding movements between two slidingly coupled plates. The plates of each pair of slidingly coupled plates, e.g., 8 and 30, 4 and 10 and 4 and 14 are slidingly retained, e.g., via tracks, such that the motion of a plate is restricted to a sliding motion relative to its counterpart and decoupling of the plates is avoided. For instance, in order to expand a first shape element 16, at least one plate 10 is slidingly driven outwardly from the center of second member 4. If the coupled plates 10 travel by the same distance outwardly from the center of the second member 4, the top plane of the second member 4 will be raised in a parallel fashion with the surface plane 22 of the shape element 16 assuming the dimensions of the pair of first members are identical. In order to cause a top plane that is not parallel with the surface plane 22, the relative travel of a first plate 10 can differ from a second plate 10 that is opposingly disposed from the first plate 10. Plate 8 is rotatably secured to a fixed edge or another shape element. In order to collapse the shape element 16, plates 10 are slidably driven towards the center of the second member 4. Similarly, in order to expand a second shape element 18 as shown in FIG. 8A, plates 10 of the first members 2 and 14 of the third members 6 should be driven outwardly from the center of the second member 4, causing the respective first and third members 2, 6 to "bend." In addition to the increased structural integrity as compared to the second shape element 18, the use of fourth members 26 in the third shape element 20 allow the top plane of the second member 4 to be raised even higher. In doing so, a plate 8 of a first member 2 is driven away from its slidingly coupled plate 30 of a fourth member 26 and a plate 12 of a third member 6 is driven away from its slidingly coupled plate 30 of a fourth member 26. Alternatively or additionally, bending of suitable first, third and fourth members 2, 6, 26 or relative rotation of plates of first, third and fourth members 2, 6, 26 can also cause the same movements achieved using sliding movements of slidingly coupled plates.

Figure 13:
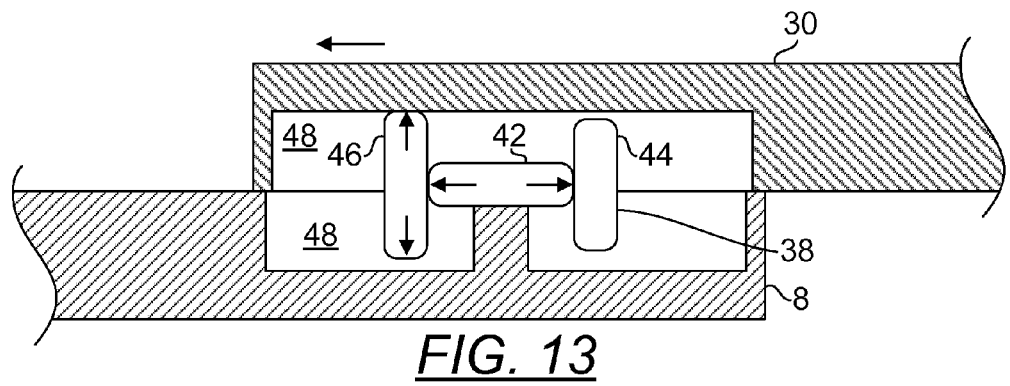
FIGS. 13-14 are partial side cross-sectional views of two slidingly coupled plates, depicting a mechanism for causing relative motion between the two plates.
Figure 14:
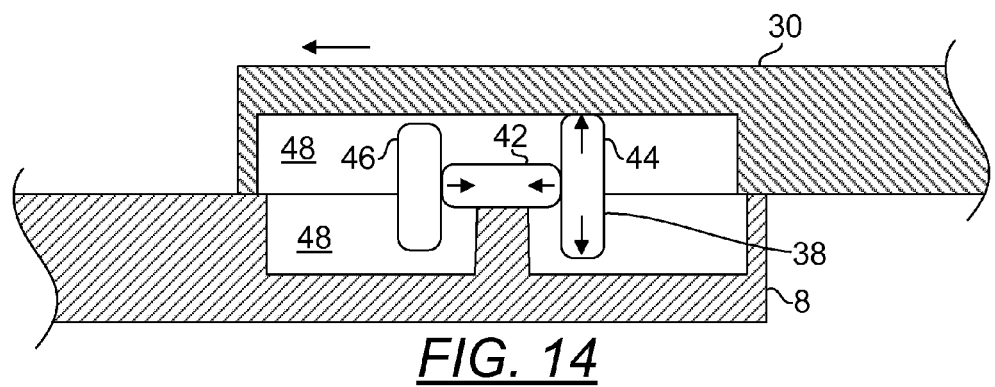
Figure 15:
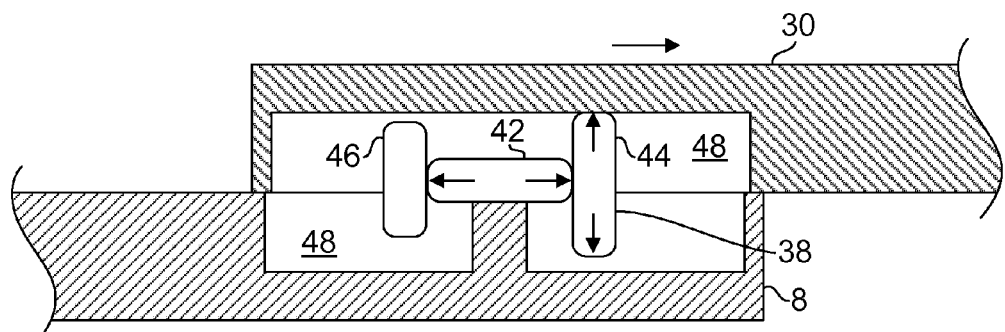
FIGS. 15-16 are partial side cross-sectional views of two slidingly coupled plates, depicting the same mechanism as shown in FIGS. 13-14 for causing relative motion between the two plates but in the opposite direction.
Figure 16:
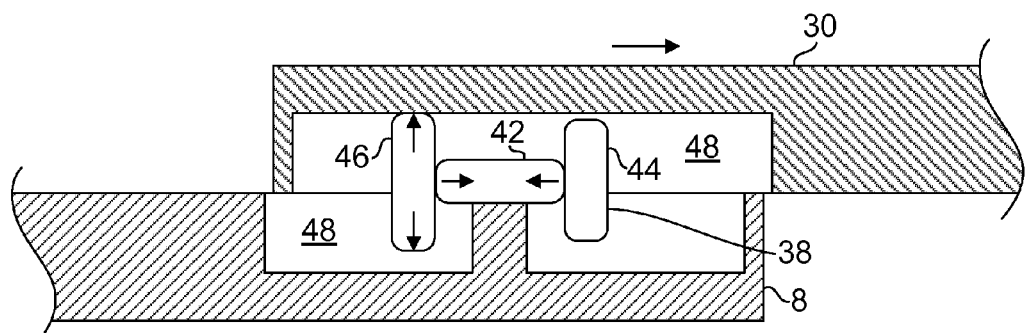

FIGS. 13-14 are partial side cross-sectional views of two slidingly coupled plates, depicting a mechanism for causing relative motion between the two plates. FIGS. 15-16 are partial side cross-sectional views of two slidingly coupled plates, depicting the same mechanism as shown in FIGS. 13-14 for causing relative motion between the two plates but in the opposite direction. In one embodiment, a cavity 48 is disposed on a surface of each plate that interfaces with its counterpart for accommodating a linear translation mechanism. In one embodiment, an inchworm motor 38 is interposed between the plates 8, 30. The inchworm motor includes a lateral piezo 42 anchored to a portion of plate 8, a forward piezo 44 disposed on one end of the lateral piezo 42 and an aft piezo 46 on the opposite end of the lateral piezo 42. FIG. 13 depicts a case where plate 30 is moved leftwardly with respect to plate 8. In doing so, the lateral piezo 42 is first disposed in its relaxed state while the aft piezo 46 is expanded to contact plate 30. The lateral piezo 42 is then expanded to move plate 30 leftwardly. In order to continue to move plate 30 leftwardly, the aft piezo 46 is relaxed. Before the lateral piezo 42 is relaxed, the forward piezo 44 is expanded to contact plate 30. The lateral piezo 42 is then expanded to move plate 30 leftwardly. These processes are repeated to continue moving plate 30 leftwardly. FIG. 14 depicts a case where plate 30 is moved rightwardly with respect to plate 8. In doing so, the lateral piezo 42 is first disposed in its relaxed state while the forward piezo 44 is expanded to contact plate 30. The lateral piezo 42 is then expanded to move plate 30 rightwardly. In order to continue to move plate 30 rightwardly, the forward piezo 44 is relaxed. Before the lateral piezo 42 is relaxed, the aft piezo 46 is expanded to contact plate 30. The lateral piezo 42 is then expanded to move plate 30 rightwardly. These processes are repeated to continue moving plate 30 rightwardly. It shall be noted that the sliding mechanism/s disclosed herein are not specific to a particular pair of slidingly coupled plates but any two slidingly coupled plates disclosed herein.

Figure 17:
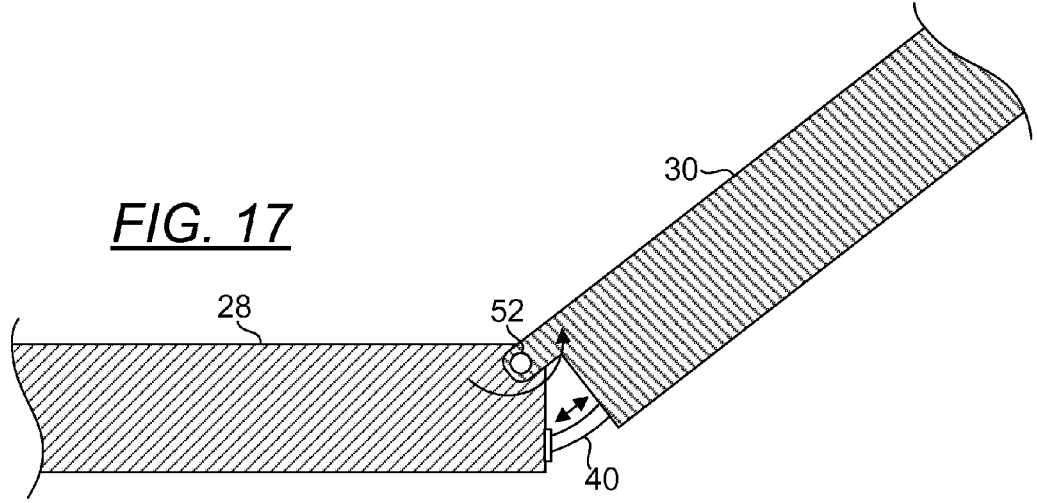
FIG. 17 is a partial side cross-sectional view of two rotatably coupled plates, depicting a mechanism for causing relative motion between the two plates.

FIG. 17 is a partial side cross-sectional view of two rotatably coupled plates, depicting a mechanism for causing relative motion between the two plates. FIG. 18 is a partial side cross-sectional view of two rotatably coupled plates, depicting the same mechanism as shown in FIG. 17 for causing relative motion between the two plates but in the opposite direction. In this configuration, two plates of a member are hingedly connected at their interfacing edges. At least one linear actuator, e.g., solenoid 40, is provided to couple the two plates. In order to bend the member, power is provided to the solenoid 40, causing it to extend and rotating one plate about the hinge 52. As the solenoid is equipped with a flexible rod, the force applied to push this rod against a plate causes it to bend and stay within the confines of the joint without protruding into the space surrounding this joint. When power is removed from the solenoid 40, it returns to its retracted state, causing it to pull one plate towards another and flatten the member (i.e., causing the plates of the member to be disposed in a parallel fashion). FIG. 19 is a partial side cross-sectional view of two rotatably coupled plates, depicting yet another mechanism for causing relative motion between the two plates. In this example, a rotary actuator 50 is connected to the plates 28, 30 at the joint. FIG. 20 is a partial side cross-sectional view of another embodiment of a first member 2, a third member 6 or a fourth member 26. In this embodiment, a first member 2, a third member 6 or a fourth member 26 is a flexible, continuous material providing structural support for the second member 4 and substrate upon which previously disclosed sliding mechanisms are disposed. It shall also be noted that the rotating mechanism/s disclosed herein are not specific to a particular pair of rotatably coupled plates but any two rotatably coupled plates disclosed herein.

Figure 21:
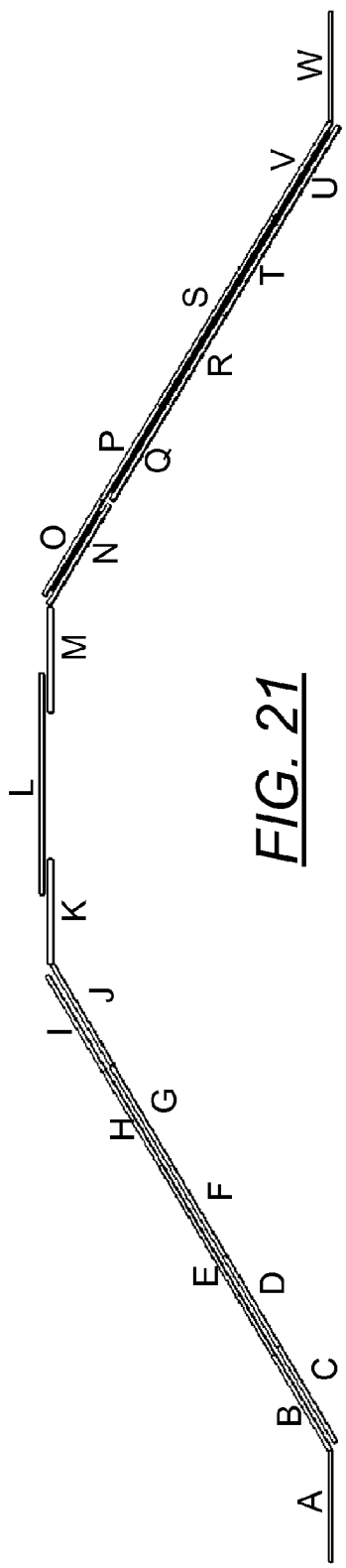
FIGS. 21-25 are side views depicting various composite shape elements comprised of various elemental shape elements and members forming elemental shape elements.
Figure 22:
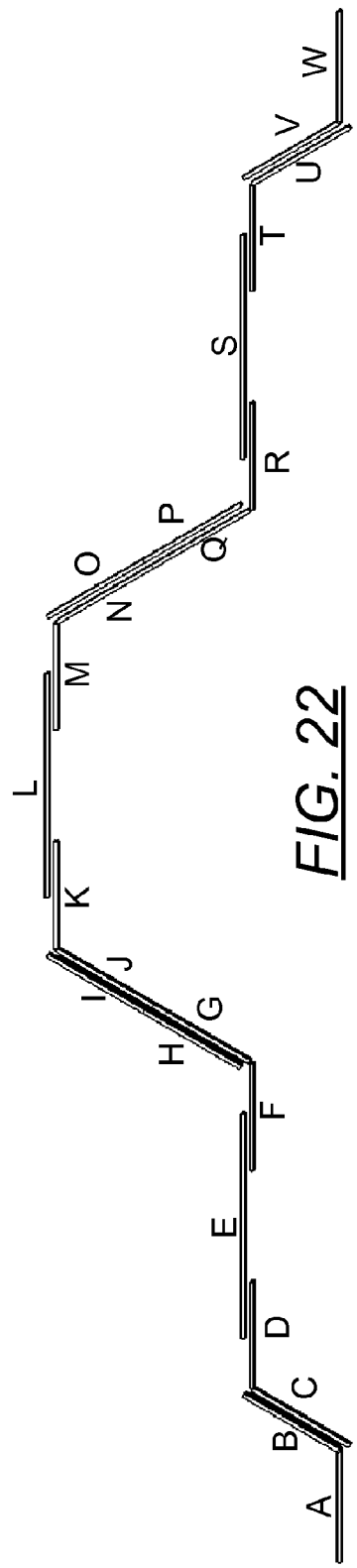
Figure 23:
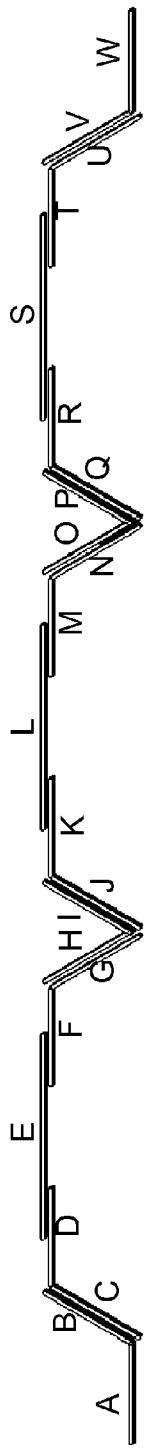
Figure 24:
Figure 25:
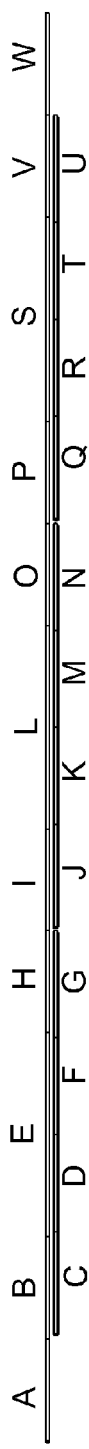

FIGS. 21-25 are side views depicting various composite shape elements comprised of various elemental shape elements and members forming elemental shape elements. For ease of explanation, each plate of a member is assigned an alphabetic character, starting from the left end of each composite shape element. FIG. 21 depicts a composite shape element having end plates A and W. It shall be appreciated that the composite shape element of FIG. 21 includes three first shape elements C-D-E-F-G, J-K-L-M-N and Q-R-S-T-U. First shape element J-K-L-M-N is connected to first shape element C-D-E-F-G via member H-I and to first shape element Q-R-S-T-U via member O-P. The composite shape element of FIG. 21 can be viewed as a "slice" disposed in an elemental plane and this composite shape element is terminated on the left side via member A-B and on the right side via member V-W. An end plate A, W may be attached to a surface plane edge or a member of another shape element. Various shapes may be formed using this composite shape element as demonstrated in FIGS. 21-25. For instance, in order to form a large raised bar, an array of the composite shape element shown in FIG. 21 can be arranged in a direction perpendicular to the elemental plane. FIG. 22 depicts a raised button formed using the same composite shape element shown in FIG. 21. Notice that in order to form the shape shown in FIG. 22, plates D and F and plates R and T are spread apart as compared to their respective relative positions shown in FIG. 21. Notice however that a raised bar is only possible if multiple "slices" forming the raised bar are not laterally coupled, i.e., the movement of each "slice" is independent of its adjacent "slices." This is in contrast to the composite shape element of FIG. 22 where the "slice" shown can be coupled to an adjacent "slice" in the direction perpendicular to the elemental plane to form tightly coupled adjacent "slices." For instance, a third member of a second "slice" can be coupled with a second member of a first "slice" at second members E, L and S of the first "slice" while still allowing coupled "slices" of FIG. 22 to form a generally circular button having a cross-sectional profile of the composite shape element of FIG. 22. A laterally uncoupled "slice" of FIG. 23 or FIG. 24 is capable of forming the profile shown in FIG. 21. A laterally coupled "slice" of FIG. 23 or FIG. 24 is capable of forming the profile shown in FIG. 22. However, a laterally coupled "slice" of FIG. 22 is not capable of forming the profile shown in FIG. 21. FIG. 23 depicts a profile having three smaller raised buttons. FIG. 24 depicts a profile having only one smaller raised button while FIG. 25 shows a profile of the composite shape elements of FIGS. 21-24 in their collapsed state. It has therefore been demonstrated that, the present shape elements and members forming them may be configured in various forms to create composite shape elements which meet the needs for wide ranging surface shapes and sizes of a programmable shape surface.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An expandable and collapsible shape element comprising at least two first members 2, each of said at least two first members 2 having two plates 8, 10 rotatably connected at an edge of each of said two plates 8, 10, one of said two plates 8, 10 of said each of said at least two first members 2 is adapted to be slidably coupled with a second member 4, wherein when said two plates 8, 10 of each of said two first members 2 are disposed in a non-parallel configuration, said shape element is disposed in an expanded state and when said two plates 8, 10 of each of said two first members 2 are disposed in a parallel configuration, said shape element is disposed in a collapsed state.

2. The expandable and collapsible shape element of claim 1, further comprising a linear actuator adapted to cause one of said at least two first members 2 to slide with respect to said second member 4.

3. The expandable and collapsible shape element of claim 2, wherein said linear actuator is an inchworm motor.

4. The expandable and collapsible shape element of claim 1, wherein at least one of said plates 8, 10 of said at least two first members 2 and said second member 4 further comprises a top surface having an area of less than about 1 cm$^2$.

5. The expandable and collapsible shape element of claim 1, further comprising a display element 34 disposed on any one of said at least two first members 2 and said second member 4.

6. The expandable and collapsible shape element of claim 1, further comprising a force sensing element 32 disposed on any one of said at least two first members 2 and said second member 4.

7. The expandable and collapsible shape element of claim 1, further comprising at least one third member 6 having two plates 12, 14, one of said two plates 12, 14 of said third member 6 is adapted to be slidably coupled with said second member 4.

8. The expandable and collapsible shape element of claim 7, further comprising an actuator adapted to cause said two plates 12, 14 of said third member 6 to rotate with respect to one another.

9. The expandable and collapsible shape element of claim 1, further comprising at least one fourth member 26 having two plates 28, 30 rotatably connected at an edge of each of said two plates 28, 30, one of said two plates 28, 30 of said fourth member 26 is adapted to be slidably coupled with a plate 8 of said first member 2.

10. The expandable and collapsible shape element of claim 9, further comprising an actuator adapted to cause said two plates 28, 30 of said at least one fourth member 26 to rotate with respect to one another.

11. The expandable and collapsible shape element of claim 1, further comprising at least one actuator adapted to cause said two plates 8, 10 of at least one of said first members 2 to rotate with respect to one another.

12. The expandable and collapsible shape element of claim 11, wherein said at least one actuator is selected from the group consisting of a linear actuator and a rotary actuator.

13. The expandable and collapsible shape element of claim 1, further comprising at least one fourth member 26 having two plates 28, 30 rotatably connected at an edge of each of said two plates 28, 30 of said at least one fourth member 26, one of said two plates 28, 30 of said fourth member 26 is adapted to be slidably coupled with a plate 12 of said third member 6.

14. An expandable and collapsible shape element comprising at least two first members 2, each of said at least two first members 2 having two plates 8, 10 rotatably connected at an edge of each of said two plates 8, 10, one of said two plates 8, 10 of said each of said at least two first members 2 is adapted to be slidably coupled with a second member 4 and at least one third member 6 having two plates 12, 14, one of said two plates 12, 14 of said at least one third member 6 is adapted to be slidably coupled with said second member 4, wherein when said two plates 8, 10 of each of said two first members 2 are disposed in a non-parallel configuration and when said two plates 12, 14 of said at least one third member 6 are disposed in a non-parallel configuration, said shape element is disposed in an expanded state and when said two plates 8, 10 of each of said two first members 2 are disposed in a parallel configuration and when said two plates 12, 14 of each of said at least one third member 6 is disposed in a parallel configuration, said shape element is disposed in a collapsed state.

15. The expandable and collapsible shape element of claim 14, further comprising a linear actuator adapted to allow one of said at least two first members 2 to slide with respect to said second member 4.

16. The expandable and collapsible shape element of claim 15, wherein said linear actuator is an inchworm motor.

17. The expandable and collapsible shape element of claim 14, further comprising a display element 34 disposed on any one of said at least two first members 2 and said second member 4.

18. The expandable and collapsible shape element of claim 14, further comprising a force sensing element 32 disposed on any one of said at least two first members 2 and said second member 4.

19. The expandable and collapsible shape element of claim 14, further comprising at least one fourth member 26 having two plates 28, 30 rotatably connected at an edge of each of said two plates 28, 30, one of said two plates 28, 30 of said fourth member 26 is adapted to be slidably coupled with a plate 8 of said first member 2.

20. The expandable and collapsible shape element of claim 14, further comprising an actuator adapted to cause said two plates 8, 10 of at least one of said first members 2 to rotate with respect to one another.

* * * * *